Figure 1:
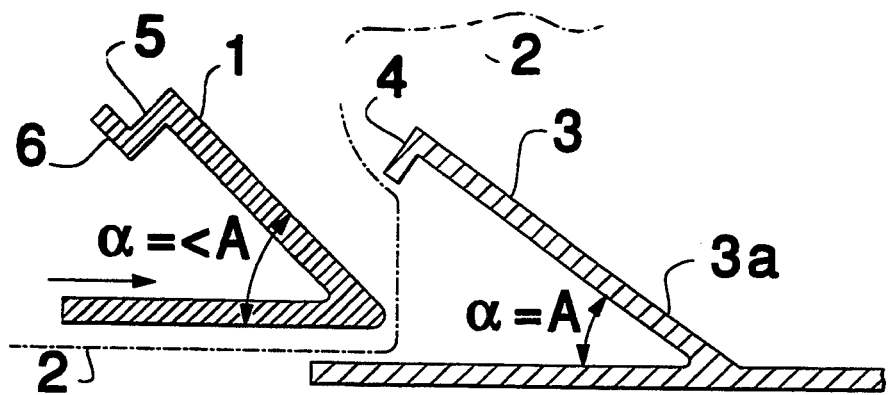

United States Patent [19]

Vermeulen

[11] Patent Number: 5,380,120
[45] Date of Patent: Jan. 10, 1995

[54] GREENHOUSE, PROVIDED WITH A PROFILE FRAME FOR GUIDING A FOIL AND ALSO PROVIDED WITH A SNAP-ON FRAME FOR THE AFFIXING THEREOF, AS WELL AS A PROFILED FRAME, A SNAP-ON FRAME, A CLAMPING CONSTRUCTION AND A PROFILED BEAM

[75] Inventor: Arnoldus H. A. Vermeulen, Terheyden, Netherlands

[73] Assignee: Rolloos Sorensen B.V., Raamsdonksveer, Netherlands

[21] Appl. No.: 916,004

[22] PCT Filed: Dec. 4, 1991

[86] PCT No.: PCT/NL91/00262
§ 371 Date: Sep. 30, 1992
§ 102(e) Date: Sep. 30, 1992

[87] PCT Pub. No.: WO92/10086
PCT Pub. Date: Jun. 25, 1992

[30] Foreign Application Priority Data

Dec. 6, 1990 [NL] Netherlands .............. 9002687

[51] Int. Cl.⁶ ............... B25G 3/00; A47H 13/00
[52] U.S. Cl. .................. 403/405.1; 160/395; 47/17; 24/462; 52/63; 52/222
[58] Field of Search .......... 52/63, 222; 47/17 FM; 160/41, 395; 24/462, 460, 459; 403/405.1

[56] References Cited

U.S. PATENT DOCUMENTS

| | | | |
|---|---|---|---|
| 3,803,671 | 4/1974 | Stuppy et al. | |
| 4,790,037 | 12/1988 | Phillips | 52/222 X |
| 4,967,424 | 11/1990 | Stegmeier | 24/262 X |
| 5,009,540 | 4/1991 | Nolan | 403/405 |
| 5,046,546 | 9/1991 | Benedyk et al. | 24/262 X |
| 5,197,238 | 3/1993 | Peleg | 52/63 X |

FOREIGN PATENT DOCUMENTS

| | | |
|---|---|---|
| 1035536 | 8/1978 | Canada . |
| 2511221 | 2/1983 | France . |
| 0805953 | 6/1951 | Germany . |
| 6400637 | 7/1965 | Netherlands . |
| 8501088 | 3/1985 | WIPO . |
| 8803231 | 5/1988 | WIPO . |

*Primary Examiner*—Carl D. Friedman
*Assistant Examiner*—Robert J. Canfield
*Attorney, Agent, or Firm*—Evenson, McKeown, Edwards & Lenahan

[57] ABSTRACT

A greenhouse in which a foil (2) is affixed in a profiled frame (3) of "V"-form by a snap-on frame (1) also of "V"-form and in which at least one of the legs (3a) is provided with an extending edge (4). In a particular embodiment one of the legs of the profiled snap-on frame (1) is provided with another extending edge (5) and possibly a flap (6). The new construction has not only the advantage of simplicity but also the advantage that it is easy to fit and easy to remove.

11 Claims, 2 Drawing Sheets

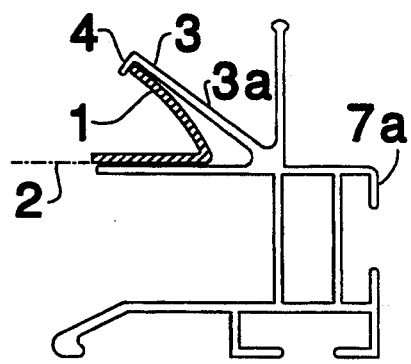
FIG.5
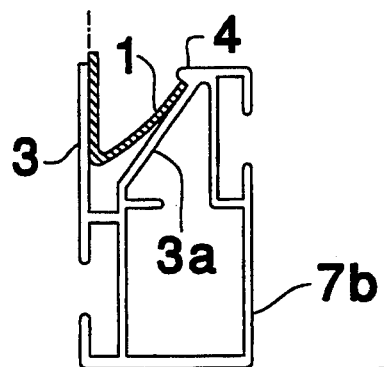
FIG.6
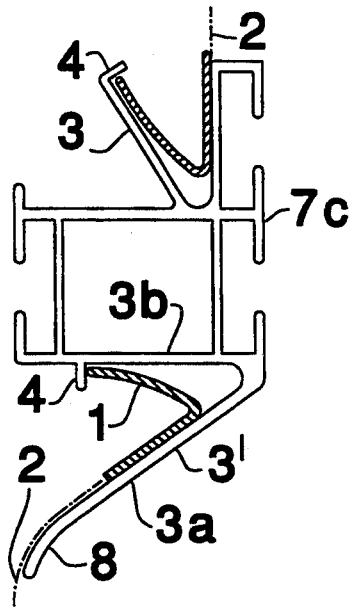
FIG.7
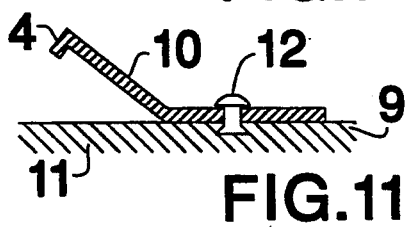
FIG.9
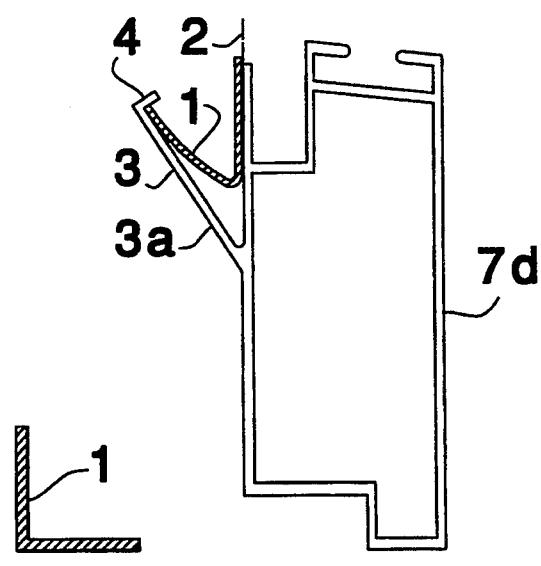
FIG.8
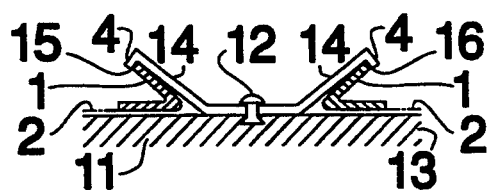
FIG.11
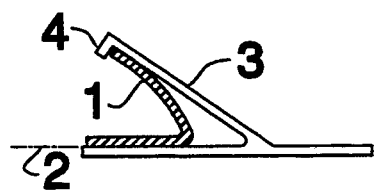
FIG.10
FIG.12

GREENHOUSE, PROVIDED WITH A PROFILE FRAME FOR GUIDING A FOIL AND ALSO PROVIDED WITH A SNAP-ON FRAME FOR THE AFFIXING THEREOF, AS WELL AS A PROFILED FRAME, A SNAP-ON FRAME, A CLAMPING CONSTRUCTION AND A PROFILED BEAM

A greenhouse provided with a profiled frame for guiding a foil and also provided with a snap-on frame for the affixing thereof, as well as a profiled frame, a profiled snap-on frame, a clamping construction and a profiled beam.

The invention relates to a greenhouse provided with a profiled frame 3 for guiding a foil 2 and which said foil 2 can be affixed thereto with the aid of a snap-on frame 1.

The invention also relates to profiled frames, snap-on frames and clamping constructions for foil and to profiled beams for greenhouses for so far as these can be adapted for greenhouses.

For so far as the invention is concerned, the foil 2 is to be construed as meaning a material the dimensions of which in the length and breadth are large when compared to that of the thickness and that it exhibits some degree of flexibility. In the foregoing context one may think of a foil, film or a sheet-like material in general, whether or not it has a profiled cross-section, and which is to be retained in a fixed position when in use. Examples of such a material are plastic films, awnings, screens, covers and suchlike.

A greenhouse having the foregoingly quoted characteristics is known in which a lower side of the foil, forming the sidewall of the overcovering of a greenhouse, is affixed to a gutter construction by means of a profiled frame for foil guidance and by a snap-on frame.

It is noted that the construction of this prior art is meant to be the side or upper wall of a greenhouse in which the forms of the profiled frame and the snap-on frame are complicated and the foil is not easily removed therefrom. Another disadvantage is that the foil is difficult to stretch into place thus adding yet another disadvantage if the foil is to be used in a greenhouse as a sunblind or as insulation.

The object of the invention is now to provide a simple construction for affixing foil to a greenhouse and having the a profiled frame 3 applicable to a clamping construction for a greenhouse.

The profiled frame 3 is therefor preferably manufactured from metal, hard plastic or combination thereof.

The invention also relates to a profiled snap-on frame 1 applicable to a clamping construction for a greenhouse.

The profiled snap-on frame 1 is preferably manufactured from a spring material.

Suitable spring materials in this context are elastomer materials such as PVC (polyvinylchloride), PP (polypropylene) or thin aluminium strip.

As previously stated herein, the invention also relates to profiled beams 7a-7a applicable for use in a greenhouse and are thus provided with one or more profiled frames (3,3' . . . ) each of which co-operates with a profiled snap-on frame 1 and are thus produced as a clamping profile of "V" form for the foil 2 and in which at least one of the legs 3a of the profiled frames (3,3' . . . ) is provided with an extending edge 4.

If the profiled beams 7 are provided with two profiled frames (3,3') for example then this has the advantage that a number of foils 2 can be affixed thereto. In such a case, and through the use of foils having different properties such as those of opaqueness and heat insulation, these foils will only permit distribution and easy penetration of light of a certain wavelength to separate compartments of the greenhouse.

Preferably in the case of a profiled beam 7, easily manufactured by extrusion, only one of the legs 3a is provided with an extending edge 4.

In this case it is possible to provisionally apply tension to the foil 2 by pressing it along the extending edge 4 by means of the pointed extremity formed by the apex of the profiled snap-on frame 1. Following this, the foil 2 is finally tensioned by allowing the profiled snap-on frame 1 to fall behind the extending edge 4.

It appears that by using a sufficiently springy material for the profiled snap-on frame 1, a greenhouse-applicable advantage that the foil 2 is easy to pull into place and affix.

Furthermore the new construction has the advantage that the foil 2 is easy to remove. As stated previously herein the affixing, pulling into place and removal of the foil 2 are advantages of particular importance in covering greenhouses.

According to the present invention both the profiled frame 3 and the profiled snap-on frame 1 are designed as cooperating clamping sections of "V" form and in which at least one of the legs 3a of the profiled frame 3 is provided with an extending edge 4.

With the new clamping construction one can easily by pressing the apex of the "V" of the snap-on frame into the foil stretch this one preliminarily and subsequently stretch further and fix in the cooperating "V" profile by putting the snap-on frame 1 after the extending edge 4.

As previously stated herein this "V" form construction of the profiled frame 3 and the snap-on frame 1 is by its simplicity more generally applicable and easier to manufacture than the construction of the prior art referred to above.

The construction of the prior art referred to above is only applicable to the fixing of the upper/side wall of a greenhouse to a gutter.

As opposed to the latter quoted arrangement, the construction according to the invention is applicable to both internal and external walls of a greenhouse. The construction according to the present invention enjoys the advantage that, in the process of affixing the foil or such like material 2 into place by inserting the "V" profiled snap-on frame 1 into the "V" profiled frame 3, the foil 2 or such like material is pulled tight with at least some play therebetween to enable it to be pulled even tighter.

The advantage of the new "V" profiled snap-on frame 1 is that if a force is applied in the pulling direction to the clamped material such as the foil 2 then the clamping assembly constituted by the "V" profiled frame 3 and the "V" profiled snap-on frame 1, exercises a greater clamping effect due to its tilting action. When the remainder material of the foil 2 is pulled in the other direction, that is to say approximately in the direction of the normal of the leg with the extending edge 4, then the clamping effect exercised by the profiled snap-on frame 1 is released automatically. In this manner simple, self-tensioning and releasing actions are achieved by means of the clamping construction according to the invention.

The legs forming the "V" profile of the snap-on frame 1 need to be of a sufficient thickness to develop enough spring pressure.

The clearance needs to be at least 10 mm.

Preferably, the extending edge of the crosspiece 4 lies at a rightangle to the leg 3a integral therewith. Another angle other than a rightangle is also possible in some cases.

According to one embodiment of the invention in which the foil 2 is better secured in the "V"-profiled clamping construction, at least one of the legs of the profiled snap-on frame 1 is provided with an extending edge 5 which co-operates with one of the extending edges 4 of the profiled frame 3.

In connection with the easy release of the tensioned foil 2 from the profiled snap-on frame 1, the extending edge 5 of the latter is provided with a flap 6.

According to a particularly preferred embodiment of the clamping construction, the profiled frame 3 and the profiled snap-on frame 1 have substantially the same apex angles.

In order to obtain a good clamping action, the apex angle of the profiled snap-on frame 1 is greater than that of the profiled frame 3 when in the rest condition.

In the case of the clamping construction according to the invention, good results are achieved if the apex angles lie in the range between 15 and 60 degrees.

Preferably the apex angles should lie in the range between 20 and 60 degrees.

As stated previously herein, the invention also relates to clamping construction can be closed by using a rightangled snap-on frame 1.

A rightangled snap-on frame 1 has the advantage that the applied pressure obtainable is maximum as the result of deformation.

The invention also relates to a profiled snap-on frame 1 of rightangled form which is applicable in affixing foils 2 in place in greenhouses in co-operation with profiled frames 3 of "V"-form and with acute apex angles.

In accordance with a preferred embodiment of the invention, the profiled frame 3 can be replaced by a profiled frame 9 which comprises two parts 10 and 11 which can be fixed to one another.

This has the advantage that the extrusion process associated with manufacture can be simplified.

In accordance with another preferred embodiment of the two-part profiled frame 9 one of the parts thereof is of flat form.

Preferably, the parts 10 and 11 can be affixed to one another by one or more screw fixings means 12.

Yet again according to another preferred embodiment of the invention, use is made of a fixable part 14 which with another fixable part 11 and the profiled snap-on frames 1 can form two clamping constructions 15 and 16 for the foil 2.

The invention is now to be described with reference to the accompanying drawings without placing any limitation on its scope whatsoever.

FIGS. 1 to 4 show schematically in cross-section four stages of introducing the profiled snap-on frame 1 of "V"-form into a profiled frame 3 of like "V"-form.

FIGS. 5 to 8 relate to different forms of a profiled beam 7 in which FIG. 7 relates to the profiled beam 7c which is provided with two profiled frames 3, 3'.

FIG. 9 relates to the start of the introduction of a rightangled snap-on frame 1 into a profiled frame 3, 3'.

FIG. 10 shows a good clamping action exercised on the foil 2 by a deformed snap-in frame 1.

FIGS. 11 and 12 again show two preferred embodiments of the invention in which use is made of a profiled frame comprising two parts affixable to one another.

FIGS. 1, 2, 3 and 4 show respectively the stages in which tensioning of the foil 2 is started, tensioning of the foil 2 is completed, the situation at the moment just before the profiled snap-on frame 1 assumes its fixed position and the situation at the end of these actions.

FIG. 1 shows respectively a profiled snap-on frame 1, a foil 2 which is to be affixed in position and a profiled frame 3.

The reference 3a shows one of the legs of the profiled frame 3 and which leg is provided with an extending edge 4.

The profiles of the snap-on frame 1 and the frame 3 each are "V"-shaped in cross-section and, when the frames 1 and 3 are separated, the apex angle of the snap-on frame 1 is somewhat greater than the angle A of the profiled frame 3.

The profiled frame 3 is for example part of the construction of a greenhouse, as is the profiled beam 7 for example.

Examples of profiled beams 7 are shown in FIGS. 5 to 8 inclusive which are yet to be described.

In FIG. 1 the profiled snap-on frame 1 is provided with an extending edge 5 which can co-operate with the extending edge 4 of the leg 3a of the profiled frame 3. Through the co-operative working of the extending edges 4 and 5 of the profiled snap-on frame 1 and the profiled frame 3, the foil 2 can be better affixed in position.

In order to remove the profiled snap-on frame 1 of FIG. 1 in a better manner if it is desired to free the foil 2 from the clamping effect imposed thereon, the extending edge 5 of the profiled snap-on frame 1 is provided with a flap 6 for this purpose.

Naturally the flap 6 need not extend over the whole of the transverse length of the profiled snap-on frame 1.

As previously stated herein, the foil 2 may be used either as protection against the ingress of light or for the retention of heat.

Figure 2:
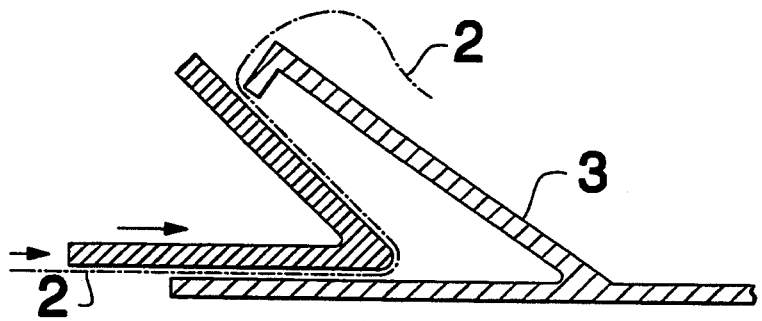

The profiled snap-on frame 1 of FIG. 2 is pushed in the direction of the arrow into the frame 3 of like "V"-form and through which the extending edge 4 exerts a deforming force on the associated leg of the profiled snap-on frame 1. In this position the foil 2 has been pulled tighter.

Figure 3:
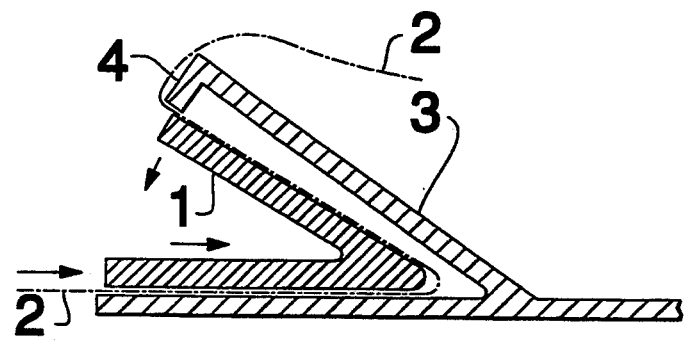

In FIG. 3 the profiled snap-on frame 1 has been introduced further into the profiled frame 3 and through which the extending edge 4 of the profiled frame 3 further deforms the concerned leg of the profiled snap-on frame 1. The deformation is indicated by the arrow associated therewith.

Figure 4:
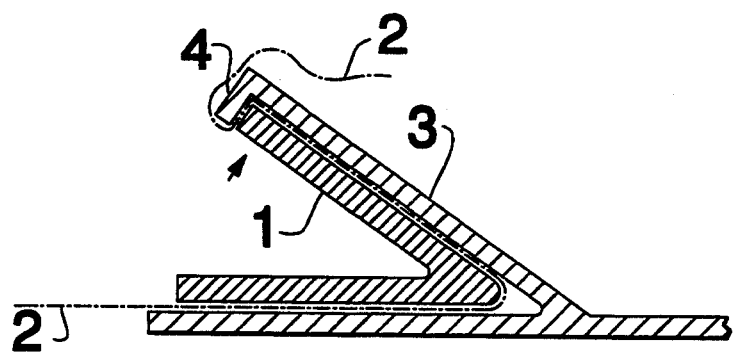

In FIG. 4, the upper leg of the profiled snap-on frame 1 has moved past the extending edge of the profiled frame 3 and the foil 2 has been clamped fast in the latter.

The clamping fast of the foil 2 between the extending edge 4, the profiled snap-on frame 1 and the profiled frame 3 is indicated by an arrow.

It is to be noted here that the more complicated design of the profiled snap-on frame 3 of FIG. 1 offers the following further advantages hereof.

Due to the extending edge 5, the profiled snap-on frame 1 is better enabled to join up with the configuration of the leg 3a of the profiled frame 3 and through which the foil 2 is better affixed therebetween.

Alongside the advantage that the foil 2 can be more easily freed by hand because of the flap 6, it has the further advantage that better clamping or affixing of the foil 2 can be achieved.

FIGS. 5, 6 and 8 give cross sections of additional examples of profiled beams 7a, 7b and 7d which are provided with one profiled frame 3 of "V"-form.

These profiled beams 7a, 7b and 7d possess extending edges 4 on the so-called "standing" leg 3a of the profiled frame 3.

A variation is the profiled beam 7b of FIG. 6 in which its extending edge 4 extends at a somewhat shallow angle therefrom instead of at a rightangle.

FIG. 7 shows an example of a profiled beam 7c which includes two profiled frames 3 and 3′. In the case of the profiled frame 3′ the extending edge 4 thereof is located on the so-called "lying" leg 3b of the profiled frame 3′.

Placing the extending edge 4 of the profiled frame 3′ on the "lying" leg 3b has the advantage that the construction of the profiled beam 7c can better take up any possible forces which might arise.

Furthermore FIG. 7 illustrates that the so-called "standing" leg 3a can guide the foil 2 in a desired direction by the guiding member 8.

FIG. 9 is a schematical cross-section of a rightangled snap-on frame 1 of square form.

FIG. 10 illustrates how the foil 2 can better be affixed behind the extending edge 4 by deformation of a rightangled snap-on frame 1.

In tensioning and affixing the foil 2 in a profiled frame 3, the profiled snap-on frame i assumes a somewhat distorted form as the result of its deformation. Due to this distortion, the profiled snap-on frame 1 engages the leg of the profiled frame 3 as it were over a fairly large surface of engagement which is of advantage in affixing the foil 2 in place.

The deformation of the foil fixing leg of the profiled snap-on frame 1 is, as it were, a simple replacement for the extending edge 5 of the profiled snap-on frame 1, as shown in FIG. 1.

FIG. 11 shows a cross-section of a profiled frame 9 which comprises two parts 10 and 11 which are affixable to one another to form the profiled frame 9 of "V"-form. In this case the part 11 of parts 10 and 11 is flat.

Parts 10 and 11 are joined together by screw fixing means 12 to form the profiled frame 9 of "V"-form.

Here the part 10 is provided with an extending edge 4.

FIG. 12 shows a cross-section of a profiled frame 13 formed by a detachable part 14 which concurrently forms two clamping constructions 15 and 16 of "V"-form.

In FIG. 12, the part 14 is affixed to the flat part 11 by screw fixing means 12. Part 14 is provided with extending edges 4. A foil 2 is clamped between both the opposing sides of the profiled frames of "V"-form by the profiled snap-on frames 1 which assume a supporting position behind the extending edges 4.

Through this, two clamping constructions of "V"-form 15 and 16 for foil 2 are now formed.

The detachable part 14 has the advantage that this can be easily affixed to a stationary foundation or another profiled beam 7.

I claim:

1. In a means for fastening a foil to a greenhouse, said fastening means comprising at least one strip of substantially rigid profiled frame within which a strip of flexible snap-on frame is receivable to clamp said foil therebetween, said profiled frame and snap-on frame strips each being V-shaped in cross-section and having first and second legs joined at an apex to define an interior angle of said profiled frame and an exterior angle of said snap-on frame, said first leg of said profiled frame having an edge extending toward said second leg thereof so as to provide an abutment engageable by said first leg of said snap-on frame, and said angle of said snap-on frame in an unflexed condition being greater than said angle of said profiled frame in order to effect a snap fit of said snap-on frame within said profiled frame, the improvement comprising:

said snap-on frame being substantially uniform in thickness throughout, and said first and second legs of said snap-on frame being substantially equal in length to each other, in order to provide identical functioning of said fastening means in clamping said foil for opposite lengthwise orientations of said snap-on frame strip relative to said profiled frame strip.

2. The improvement as in claim 1, and further comprising:

an outside length of each of said first and second legs of said snap-on frame being generally equal to an inside length of said first leg of said profiled frame such that said said snap-on frame is substantially nestable within said profiled frame during clamping of said foil by said fastening means.

3. The improvement as in claim 1, and further comprising:

said first and second legs of said snap-on frame being identically flexible.

4. The improvement as in claim 1, wherein said greenhouse has beam means for supporting said foil, and further comprising:

said profiled frame strip being formed integrally and lengthwise coextensive with said beam means; and said snap-on frame being an extruded strip of material said material and said thickness being sufficient to provide that said first and second legs of said snap-on frame are equally flexible toward and away from each other.

5. The improvement as in claim 4, and further comprising:

said beams means and integrally formed profiled frame being an extrusion of at least one element of a set including metal and hard plastic materials.

6. The improvement as in claim 5, wherein said metal is aluminum.

7. The improvement as in claim 5, wherein said hard plastic is an elastomer.

8. The improvement as in claim 5, wherein:

said beam means comprises at least one tubular beam having a wall and at least one of said legs of said integrally formed profiled frame protruding outwardly from said wall.

9. The improvement as in claim 8 and further comprising:

said first leg of said profiled frame being a portion of said wall of said tubular beam; and said second leg of said profiled frame protruding outwardly from said wall; and said extending edge protruding from said portion of said wall and providing lengthwise resistance to bending of said tubular beam.

10. The improvement as in claim 9, and further comprising:

guiding means for said foil clamped in said fastening means, said guiding means comprising a free end of said second leg of said profiled frame being gently curved away from said wall portion so as to provide said clamped foil with a smooth transition out of said fastening means and in a direction substantially perpendicular to said first leg of said profiled frame.

11. The improvement as in claim 1, and further comprising:
   said exterior angle of said snap-on frame being substantially 90 degrees; and
   said interior angle of said profiled frame being in a range of about 15 degrees to about 60 degrees.

* * * * *